United States Patent [19]

Robinson

[11] Patent Number: 5,519,965
[45] Date of Patent: May 28, 1996

[54] PROTECTIVE CANOPY

[76] Inventor: Michael D. Robinson, School Road, Waimauku, Auckland, New Zealand

[21] Appl. No.: 216,954

[22] Filed: Mar. 24, 1994

[51] Int. Cl.[6] .............................. A01G 13/00; A47G 7/08
[52] U.S. Cl. ........................................ 47/31; 47/26
[58] Field of Search ................ 47/31, 26, 26 F; 52/63

[56] References Cited

U.S. PATENT DOCUMENTS

| | | | |
|---|---|---|---|
| 1,106,624 | 8/1914 | Cadwallader et al. | 47/26 |
| 2,974,442 | 3/1961 | Womelsdorf | 47/26 |
| 3,100,950 | 8/1963 | Heuer . | |
| 3,140,563 | 7/1964 | Allen | 47/26 |
| 4,062,146 | 12/1977 | Grossman et al. | 47/26 F |
| 4,296,568 | 10/1981 | Dukes . | |
| 5,265,373 | 11/1993 | Vollebregt . | |
| 5,311,699 | 5/1994 | Huffman | 47/26 |

FOREIGN PATENT DOCUMENTS

| | | | |
|---|---|---|---|
| 520076 | 10/1976 | U.S.S.R. | 47/31 |
| 1319801 | 6/1987 | U.S.S.R. | 47/26 |

*Primary Examiner*—Terry Lee Melius
*Assistant Examiner*—Joanne C. Downs
*Attorney, Agent, or Firm*—Young & Thompson

[57] ABSTRACT

An easily deployed barrier 400, shade or shield intended for agricultural or horticultural protection against hail, birds, sunlight, and the like is comprised of open-weave fabric 401 held over the items 402 to be protected so that it tends to assume a rectangular outline when in the fully spread out position and tends to become a slanted parallelogram outline when in the fully closed or contracted position. The shape of the barrier is altered by pulling either cord 411 or cord 410 along one edge along the direction of the length of the cloth. Accessories including supports 403, deposited-load release mechanisms 422, cross-cables 412 for stability, and deployment means 415, 419 are also described. The barriers may be deployed automatically. Barriers of this type can cover large areas such as an entire orchard.

11 Claims, 8 Drawing Sheets

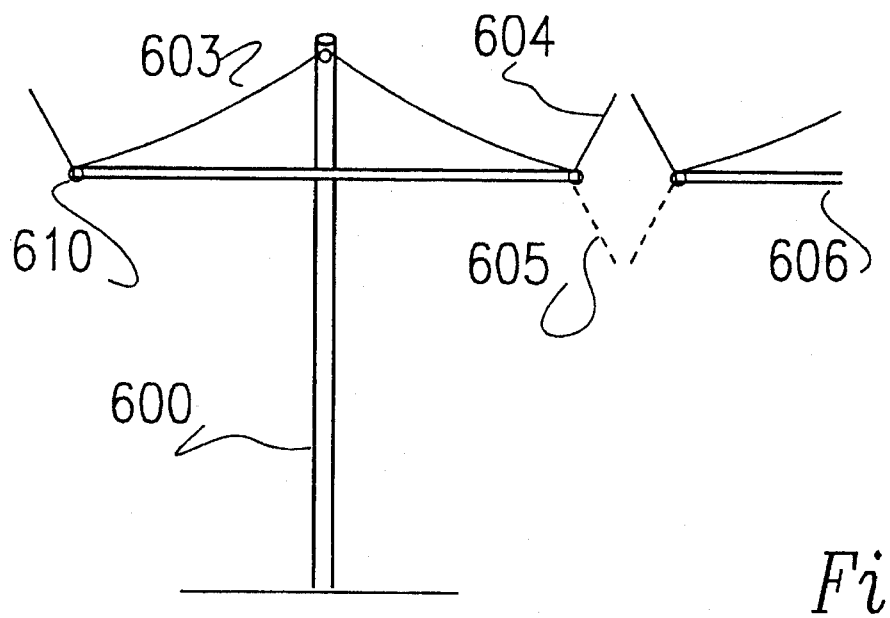
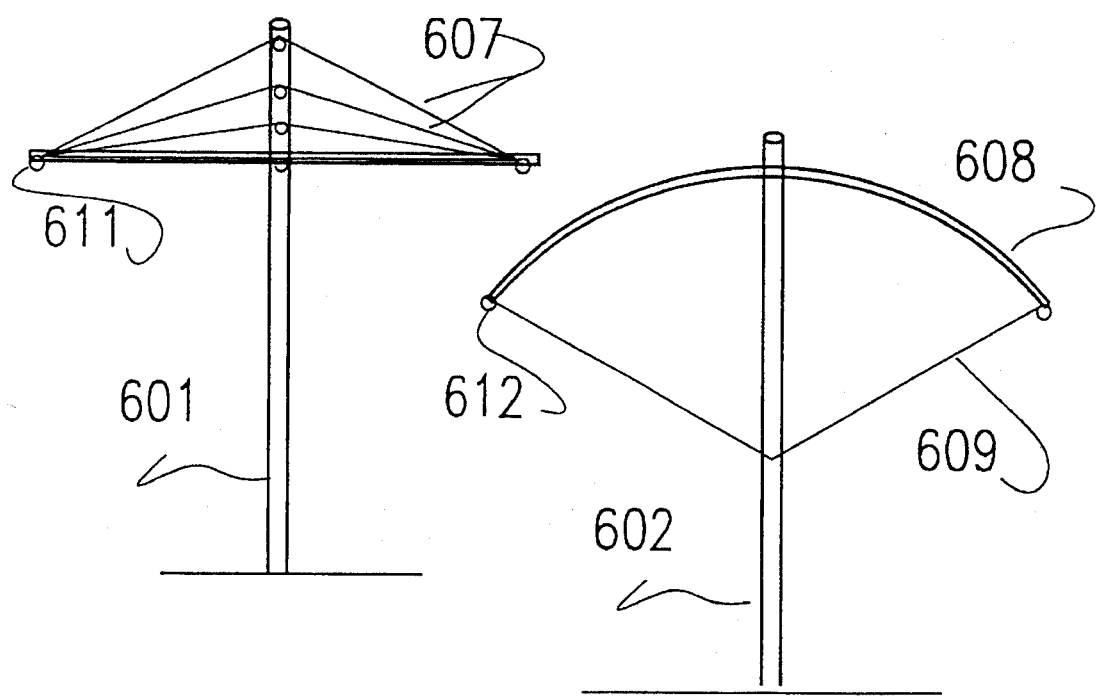
Fig 6

PROTECTIVE CANOPY

FIELD OF THE INVENTION

This invention relates to the field of providing a protective canopy and has particular application to the provision of retractable protective coverings for plants and/or animals in an outside space, or inside a greenhouse or other permanent structure such as a shadehouse.

BACKGROUND OF THE INVENTION

Damage affecting pip-fruit trees in particular but also many other crops is likely as a result of adverse weather; particularly from hailstorms. One severe hailstorm, not an infrequent event, can totally destroy a crop and hence the income from it, or damage a crop by bruising so that it is downgraded to a less remunerative grade.

Other damage by wind, bats, insects, birds, frost and the like is also a perennial problem for gardeners and horticulturists, and while it is possible to put up or grow windbreaks to catch horizontal winds these have no effect on vertically oriented hazards like hailstones. One could build a roof over the crop, but this is expensive and furthermore as it is desirable to retract the protection when not required, a constructed roof is inappropriate. Retraction aids in protecting the structure itself during winds and snow, and lets more light, and desirable insects such as bees arrive at the plants below.

Plants respond to an improved environment but the optimum environment for a given plant changes with the weather, the time of day, and over the seasons. Hail protection for example is important when fruit is developing, but is not needed over winter. In winter, snow (to take one example) could overload a structure arranged to catch hail. To avoid these types of overloads, and to be able to modify the environment on a seasonal or daily basis if useful in particular circumstances, it is useful to be able to take away or re-install the generally horizontal canopies now used to provide sun, hail, bird, insect or wind protection.

OBJECT OF THE INVENTION

It is an object of the present invention to provide an improved means for protecting plants or animals from adverse environmental conditions or one which will at least provide the public with a useful choice.

SUMMARY OF THE INVENTION

In one aspect the invention provides a retractable barrier to at least partially shield an area, characterised in that the barrier is comprised of a deformable panel supported along its length by a pair of elongate flexible elements wherein each elongate flexible element is attached to one or more supports at a required distance above the ground so that the barrier can be positioned above ground in a first shielding configuration with the panel assuming a first extended substantially parallelogram shape, and wherein in use the barrier can be deformed into a contracted configuration by applying opposed forces to opposite corners of the panel to distort the panel from the extended configuration to a much narrower substantially parallelogram configuration.

Preferably the panel includes at least one deformable net (an open mesh fabric) and more preferably consists of a woven net having a loose weave allowing for movement or pivoting at the intersections. Although a knotted or knitted net may exhibit sufficient deformation, a woven net is preferable by far. Alternatively the panel may be made up of a plurality of separate strips of flexible material.

In another aspect the invention provides a barrier to at least partially surround an object and protect it from particulate material, characterised in that the barrier is comprised of elongated support means in duplicate and at least one array of linear elements supported on the elongated support means at at least two points; the array being capable of being oriented at angles ranging from a first contracted position (wherein the barrier has a miniraised area) where the elements of the array are substantially parallel to the support means to a second expanded position where the elements of the array are substantially perpendicular to the support means and the barrier assumes a configuration having a maximised area.

An example application for the barrier is in protecting vegetation from damage by hailstones and here it is provided in the form of an elongated parallelogram supported horizontally above the vegetation to be protected.

Preferably each element of the at least one array of linear elements comprises a sheet of fibrous material; preferably a woven fabric comprised of material resistant to environmental degradation. The presently preferred materials include polypropylene and polyethylene with appropriate fillers and dyes.

Preferably the weaving method used provides a loose interlocking between the warp and weft threads so that in use the fabric or textile can be easily deformed into parallelograms of various configurations. One preferred weaving method is known as the "leno" process.

Preferably the support means of the barrier comprises wires or cables passing along the longer opposite sides of the parallelogram, and rigid struts or poles passing along the shorter sides of the parallelogram.

Optionally (or in combination) the support means along the longer sides may be the (optionally selvedged) edges of the sheet or sheets of fabric.

Preferably the fabric is attached along its longer edges to the adjacent wire or cable and preferably this attachment is made by means of a clip, securing the cable to the fabric by crimping the clip to the wire or cable and then penetrating the weave of the fabric with protruding and interlocking projections from the clip.

Preferably the support means of the barrier provides for controlled lateral movement of the support means so that variation of the relative tensions applied to at least one support means of the supported barrier causes the parallelogram to alter its shape from a substantially contracted configuration to a substantially expanded configuration.

In an alternative aspect the invention provides a protective shield including a linear array comprising a series of flexible strips, anchored at each end to one of two substantially parallel cables which strips are capable of overlapping or lying side by side, and which in use provide a sun shade or a rain shield when the barrier is in its expanded configuration, and which overlap when the barrier is in its contracted configuration so that it provides a minimal obstruction to a desired environmental input such as sunlight.

In a subsidiary aspect the strips may run parallel to the edge or control cables and be held in a configuration by attachments to a series of cross members running between the edge cables.

Preferably the cross members are attached to or form part of the structure of the flexible strips.

In a further aspect the invention provides a protective shield including intermediate supports to maintain its position above a tree or a row crop.

Preferably these intermediate supports maintain the barrier in a substantially horizontal plane.

Optionally these intermediate supports may impose an arched profile to the barrier so that its edges are lower than its centre.

Optionally further supports may provide the barrier with at least one free edge extending substantially downwards, where the free edge serves as protection against obliquely oriented damaging materials.

Optionally further supports may provide the barrier with at least one free edge extending substantially upwards, where the free edge, in apposition to a free upwards-extending edge of an adjacent barrier, forms a bird, bat, or insect exclusion filter.

Preferably the barrier is supported by spreaders which normally hold the fabric in a substantially horizontal plane yet are capable of undergoing downwards deflection at their outer edges as a result of applied forces, in order to dump a built=up lead of hail or the like.

Preferably the configuration of the barrier is under control of a winch which can wind up or unwind one or more edge cables.

Preferably the winch takes the form of an elongated pipe at one end of one or several rows of the crop under protection.

Preferably the winch is under the control of an electric motor which is in turn controlled by an external sensor of imminent hail or snow.

Optionally the barrier can be oriented vertically at the side of a crop to be protected if a hazard, such as wind, wind-blown items or a swarm of flying insects is expected to arrive from a horizontal direction.

In a yet further aspect the invention provides a method for protecting a horticultural crop or area with protection against hailstorms or the like, comprising the steps of erecting one or more barriers above the crop and causing the barriers to become substantially expanded at least during periods of risk.

In a related aspect the invention includes the steps of detecting an imminent hailstorm and responding to that event by expanding the or each barrier by applying a tension along the elongated support means so that the barrier covers a wider area of the crop to be protected.

BRIEF DESCRIPTION OF THE DRAWINGS

The following is a description of some preferred forms of the invention, given by way of example only, with reference to the accompanying diagrams. When terms such as "horizontal" are used it is assumed that the item under discussion is on substantially flat land.

FIG. 6: is an elevation view of some alternative arrangements for hail barriers according to the invention.

DESCRIPTION OF THE PREFERRED EMBODIMENTS

Example 1. Hail barrier.

The invention in this application is intended to prevent particles such as hailstones from colliding at full speed with plants under protection by the barrier and it is especially intended to protect developing fruit carded by the plants. The fabric which comprises the preferred barrier has a weave tight enough to catch larger hailstones, and at least slow down small ones, while flakes of snow will also be trapped. (Spring falls of snow may damage growing tips of plants, flowers and developing fruit. Spring falls of snow are difficult to predict). The past practice is for conventional structures to be erected in the Spring to protect the crop, but these are at risk of overload from unseasonal snows. A collapse at this time presents financial problems as the crop may be lost if the damaged protection cannot be quickly replaced. Means are provided in at least some forms of the present invention to deposit accumulated ice, snow or other detritus onto the ground at the sides of the barrier when the accumulated weight exceeds a preset amount.

The barrier of this invention has been devised to provide for substantially instantaneous deployment. It is retained in a closed or contracted form lying above and along the length of a row of trees or other crop to be protected, and may be expanded to its full size simply by pulling on one or both edge-supporting cables.

Figure 1:
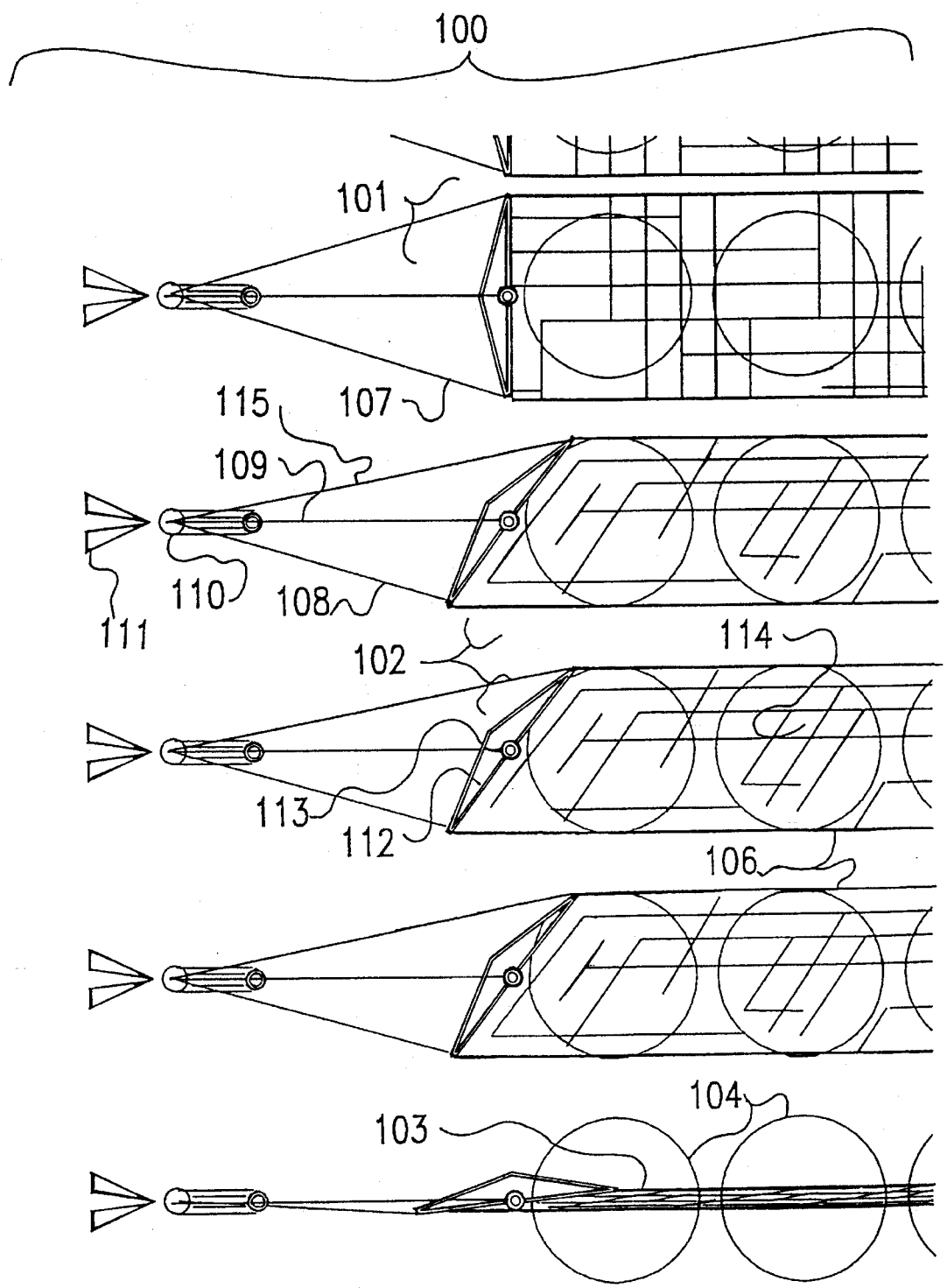
FIG. 1: is a plan view of a number of barriers according to the invention, placed over trees in an orchard.

FIG. 1 shows in plan view 100 the overall arrangement of protective barriers of this invention protecting an orchard comprising rows of trees 104. This view is at one end of five rows. The barrier 101 is fully extended; three barriers (102) are partially extended, and 103 is a substantially contracted barrier. The actual barrier fabric 114 is supported along each edge by elongated control wires or cables 106, which we call edge wires. These are preferably 12.5 gauge high tensile galvanised steel fence wire, or alternatively plastic-coated cable; preferably ⅛" VHT (very high tensile) steel, plastic-coated to ⅛" depth with a UV-resistant plastic. The barrier fabric is particularly supported by a central cable 109, preferably plastic-coated if cloth is to drape over it, otherwise it is a galvanised high-tensile cable preferably 7.5 mm (5/16") high tensile 7 strand galvanised steel cable, held in tension from anchors at each end. The safe working load of the preferred cable is 9,500 lb force (45 kN). Larger constructions are also supported from side to side by cross cables as shown in later drawings.

Figure 3:
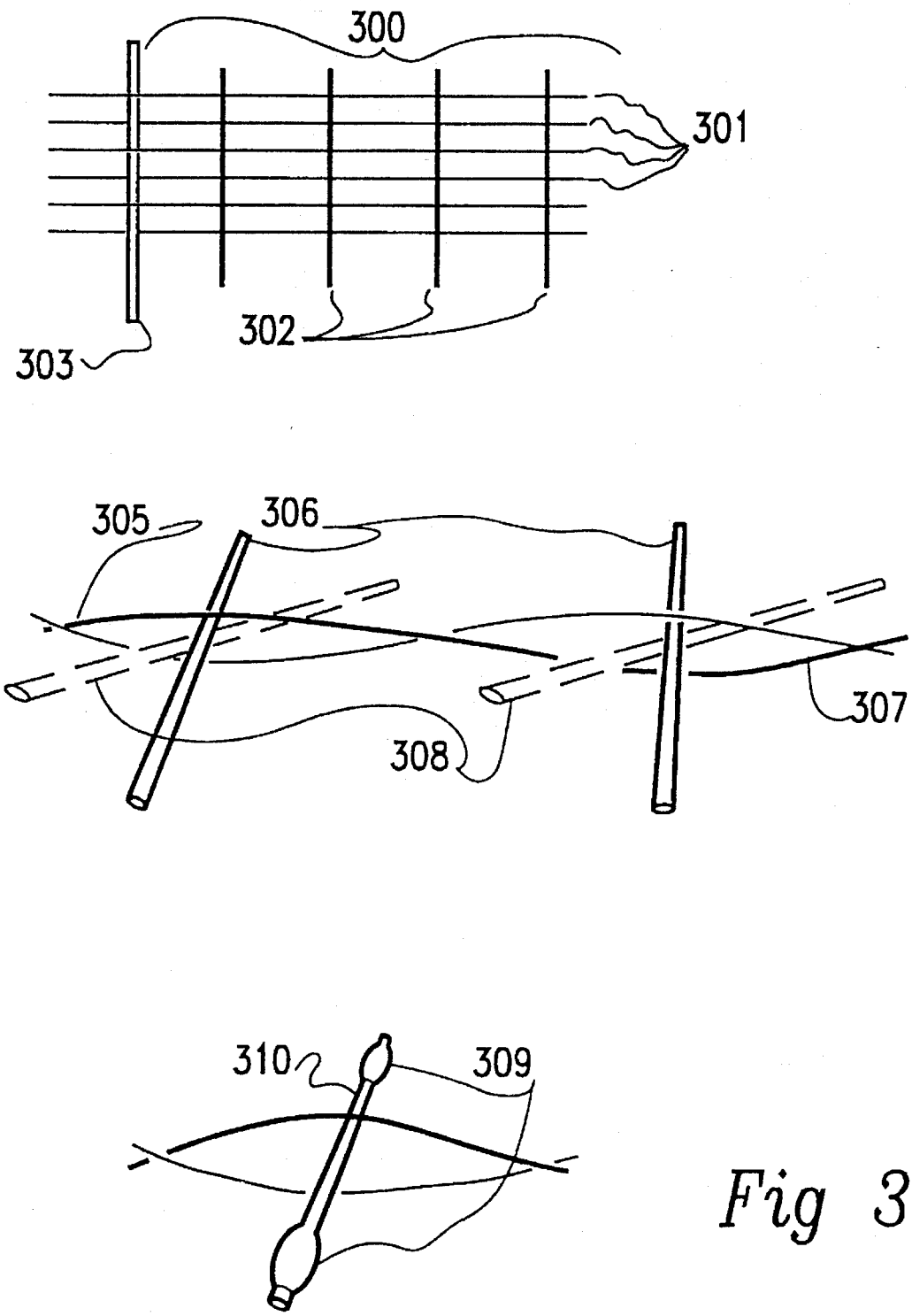
FIG. 3: illustrates a preferred woven cloth for use in the barrier.

Details of the fabric itself are provided in relation to FIG. 3.

Tensioning of the central cable is provided by cables such as cable 109, comprising a loop of 7.5 mm (5/16") high tensile 7 strand galvanised steel cable, anchored by pulleys to a pole and in turn to a deadman or anchor 111, which is one or a pair of anchors in the ground. Anchors may be driven timber posts (8 inches diameter and 8 feet long), or screw anchors with a 7" plate. The post 110 is a galvanised steel pipe sloping to the left of the drawing as it rises. The preferred pipe has an outer diameter of 3½"; wall thickness 0.22" and uses 60,000 psi steel. It is mounted on a 4' screw anchor with a 4" base plate and a 6" ground-level plate.

The control wires 107 are preferably one or two flexible ropes, having a safe load of about 2 kN (400 lb force). If one rope is pulled to one extreme it results in a totally contracted barrier as in 103, while if the other rope is pulled, or the rope at the other end on the first side is pulled, it provides a profile of maximum expansion as shown at 101. Alternatives for controlling the deployment of the barrier are given in FIGS. 4 and 5 which show one method for controlling the configuration of a number of barriers from one end of the rows.

Post 113 is a pivot post, made of galvanised steel pipe of an outer diameter of 3.5"; wall thickness 0.11" and again of 60,000 psi steel. A preferred pivot frame 112 is a length of 2"×2"×¼" steel angle reinforced with 5/16ths inch rod bent into a wide "V" shape to create a truss in the horizontal and vertical planes.

Figure 2:
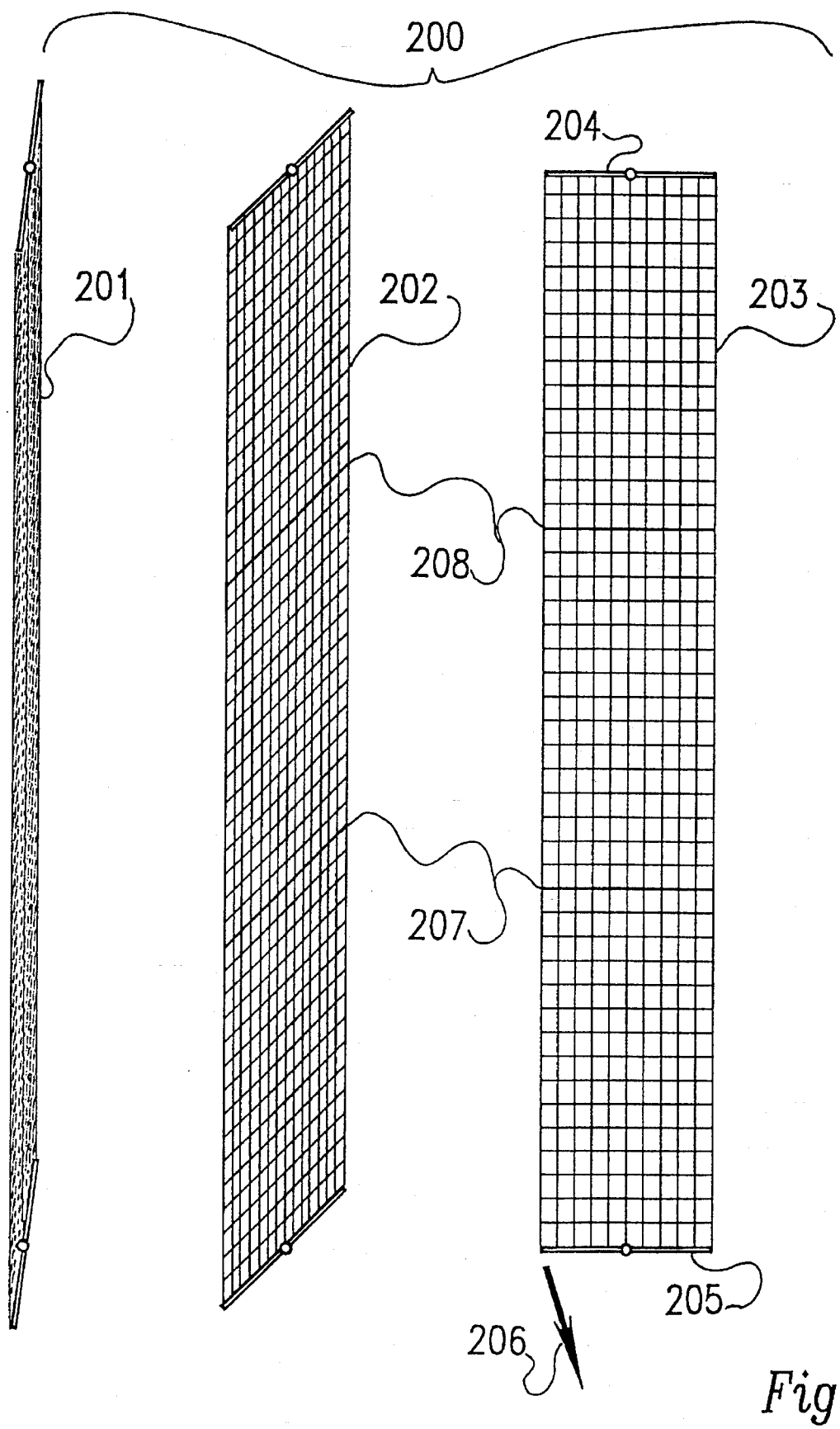
FIG. 2: is a closer plan view of a barrier according to the invention, illustrating the various configurations of a parallelogram assumed by each barrier.

FIG. 2 illustrates the manner 200 in which the preferred woven barrier fabric can undergo profound alterations in surface area as it is taken from its maximum extension state 203 through a partial extension state 202 to a contracted state 201. The arrow 206 indicates the direction in which a pull may be applied to one edge of the barrier in order to cause it to pivot on the support 204, and hence also the other support 205. Lines 207 and 208 represent intermediate supports which are supported by a central strain-bearing cable, which in turn is supported on poles. The grid of lines representing the fabric in FIG. 2 does not represent individual fibres of the fabric—which are seen only at a much finer scale as in FIG. 3.

FIG. 3 shows a preferred woven fabric or cloth in detail, as it would be produced by the "leno" weaving process. One suitable product is Australian (Sarlon Industries' hail cloth). (It is interesting to note that manufacture of this type of fibre has largely been discontinued in favour of knitted fibres). It has a warp of 13 yarn pairs per 100 mm and a weft of 31 yarn pairs per 100 mm, made of ultra-violet stabilised polyethylene fibres, diameter 55 to 65 tex. One preferred width is 4420 mm wide, with selvedge reinforcing comprising a 50 mm wide strip at each side having approximately 60 yarn pairs per 100 mm. One, or two adjacent strips may be used on a barrier.

As previously explained it is preferable that the elements of the linear array (here comprising the weft threads 302, 306, 310) can swivel easily within the structure of the fabric. This is so that the barrier as a whole can undergo the transition from a contracted to an expanded state without undue stresses, as may be experienced if the weft fibres have to be bent partially into a "S" shape when the angle between the warp 301, also 305 with 307 of the fabric is other than perpendicular. Bending one fibre is easy; bending all the fibres in a long barrier requires a lot of tension.

In 300, representing the preferred woven fabric or material at about a 1:1 scale, the warp threads are shown as 301 and the weft threads as 302. The weft threads may be thicker as indicated in the drawing, or they may be of the same diameter as the remainder of the cloth. The strip 303 indicates an optional anchoring member which may be used to maintain the location of the warp fibres in the cloth. It has been observed that fabric of the "leno" weave tends to open out—as where for example birds have forced their way through it and left holes, or where a locally applied load has distorted the cloth. We have found that altering the barrier from its contracted to its expanded state and back again—i.e. "working" the cloth—will restore the original orientation of the fibres and reduce the size of holes in a short time. The swelling 309 illustrates another optional way to maintain warp position and fabric integrity. In this part of FIG. 3, the weft fibres are provided with swellings between each of the warp fibres. These swellings may be produced by techniques known in the artificial textile industry such as using a previously stretched fibre, and locally heating it using contact or radiant heat to cause it to shorten and swell, or by knotting it.

Figure 4:
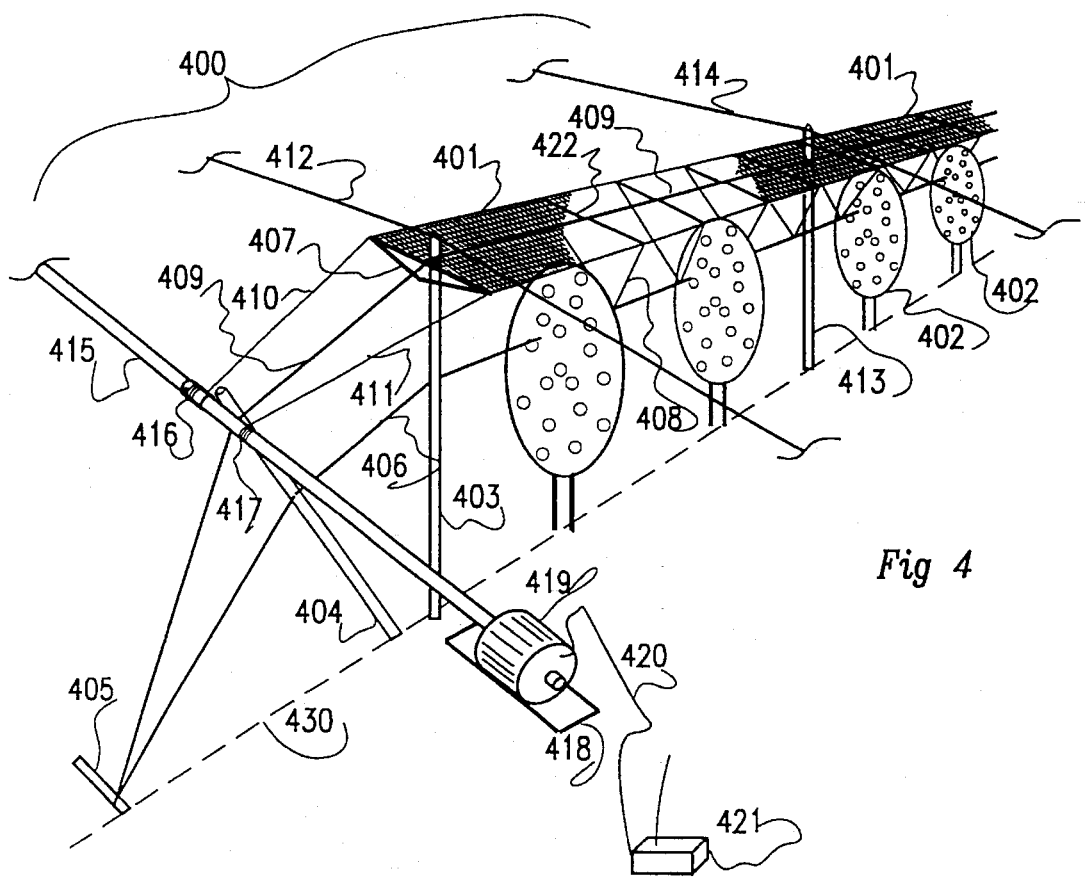
FIG. 4: is a perspective view along the length of a barrier according to the invention, placed over trees.

FIG. 4 illustrates at 400 an installed hail barrier according to the invention, covering one row 430 of possibly many rows of trees 402 in perspective view, with a protective fabric barrier 401 supported by intermediate poles 403, 413 and slung between anchored poles 404 (the other end is not visible). An anchor 405 holds the central support cable 409 in tension, and also carries a lesser tension from the intermediate cable 406. The two edge or control cables are 410 and 411, running from a winch pipe 415 past a swivel 417 and along each side of the fabric barrier 401. (For terminations of these control cables see FIG. 5). Lateral stability is provided by a number of crossways support cables 412, 414, and optionally also cables across anchored poles 404. A preferred cable material for the cross cables is ⅜" VHT galvanised 7 strand steel.

A portion of the fabric 401 has been deleted in order to show the spreaders 422 extending each side of the central support cable and which are held in position by internal spring pressure (see FIG. 8) with ties 408 attached to the intermediate cable 406. The fabric of the shield may be skewed or twisted into various parallelogram shapes (as per FIG. 2) by means of the winch pipe 415, supported on a bearing (not shown) at each row of trees (or other crops). This is an elongated winder that runs along the end of a number of rows. We have found that if one control rope 411 is wound clockwise onto the pipe, which is preferably a galvanised steel pipe of diameter 2 or 3 inches, and the other control cable 410 is wound on in the opposite or anticlockwise direction, then rotating the pipe in the clockwise direction has the effect of loosening one control cable while tightening the other cable, thus providing the deployment or contraction of the barrier. The reversible motor/gearbox unit 419, preferably on an elevated stand 418, provides rotation in either direction. Limit sensors may also be provided. A power source for the motor 421 may be operated remotely, perhaps by radio or telephone wires, or may itself detect the onset of a hailstorm and cause rotation of the winch pipe 415 in the appropriate direction.

Figure 5:
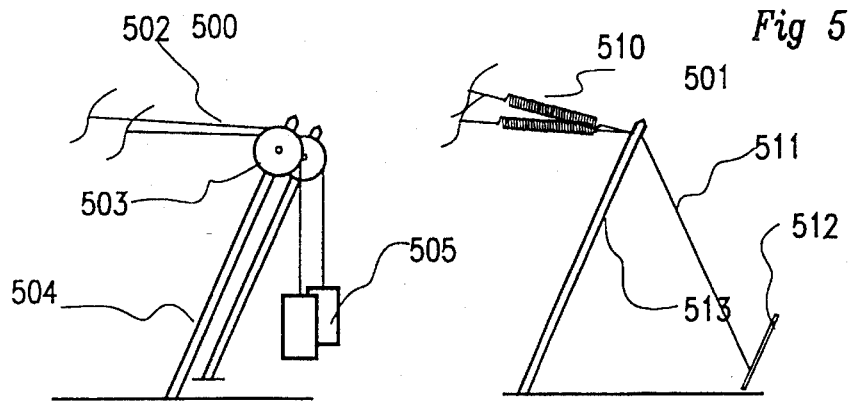
FIG. 5: illustrates some terminations for edge or control cables.

FIG. 5 illustrates at 500 one method for allowing relative movement of the edge or control cables. Each cable 502 is provided with a substantially constant tension by means of a weight 505 suspended over a pulley 503 held above the ground on an anchor pole 504. One alternative method 501 is to use tension springs 510, between the movable cables and a fixed support pole 513, which is held in position by the anchored cable 511 connected to an anchor 512.

Cross cables are preferred as means to provide extra support in the case of larger structures. In the case of smaller barriers, the cross cables would obstruct the passage of vehicles along the rows, and in particular machines for harvesting which straddle the crops. They may be made removable, or may be uncoupled and dropped to the ground, but in many cases a straddle harvester can also straddle the (contracted) barrier as it is used to harvest a crop.

Alternatively the support posts 403, 413 may be set deeper into the ground to provide individual stability and thereby render cross-cables superfluous.

Inside posts (403) if two trees apart would be steel, 2.5" OD 60K psi steel, 0.09 wall, but if used adjacent to each tree would be 2" not 2.5". This is adequate for snow loads up to 1 foot, although if over 1 foot snowfalls are expected, more substantial posts are recommended.

Figure 8:
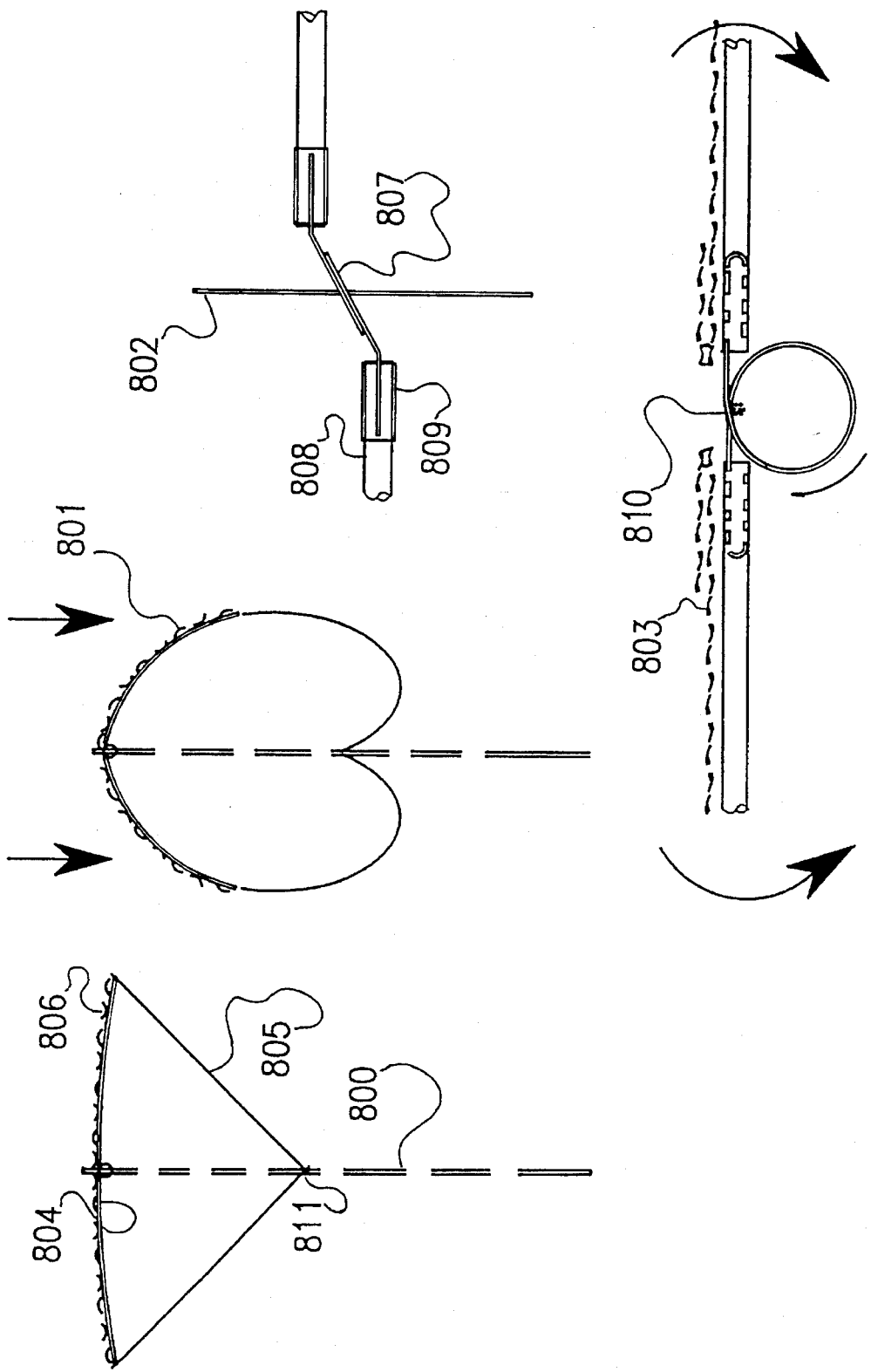
FIG. 8: is an elevation view of a preferred barrier support including means to dump heavy loads of accumulated material off the barrier to either the side of the protected area.

FIG. 6 shows early versions of frames used as supporting devices for the fabric of the barrier. (Improved supports are shown in FIG. 8). Poles 600, 601, and 602 are intermediate poles made of galvanised steel pipe, for example 2.5" OD, 0.09 inch wall thickness, 60,000 psi steel, if placed at every second tree, but if at every tree would be 2" diameter not 2.5". These poles are expected to be adequate for snow loads of up to 1 foot, but if over 1 foot snowfalls are expected, more substantial posts are recommended.

The edge cables controlling the shape of the barrier are shown at 610, 611, and 612. The actual barrier is shown at 603, or 607 (several layers of barriers to provide additional shading and shading flexibility. Note that these can be in any orientation to the horizontal. A preferred cross piece 608, 606 would be made of 25 mm(1 inch) bore PVC waste-pipe as this is flexible enough for arching as shown in 608 (held under tension by ties 609 to a lower central cable.).

The optional raised or lowered edges shown at 604 and 605 would be held by fibreglass rods of approximately ¼" dia and a length of 2 feet. These rods support a usually separate cloth strip. The purpose of raised edges is that birds on the inside can fly out more easily than birds on the outside flying in—they would not be able to find the gap at the apex of an edge. If the raised or lowered edgers were to be used as a bird net, preferably one would add temporary links between adjacent barriers. Bats (such as fruit bats) and insects may also be controlled in this way.

Figure 7:
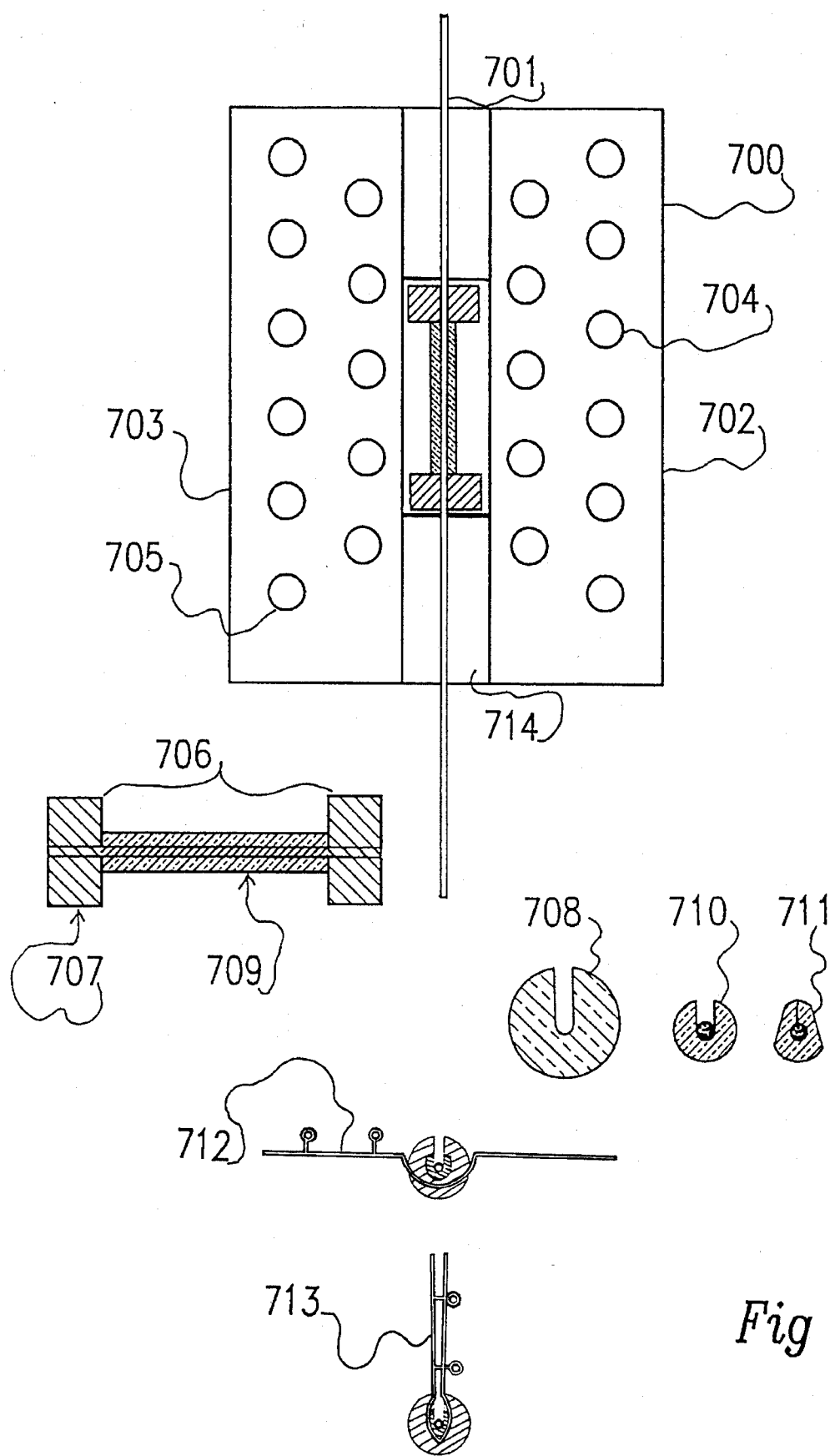
FIG. 7: illustrates a clip for supporting a woven fabric from the cables or wires of the invention.

A standard Agrinova hail clip (700 in FIG. 7) has been modified to provide a preferred clip to attach the barrier fabric to the edge wires 701. These clips can be attached from the side (without any threading-on step) and are folded over from the opened-out state as supplied (see 712) to a closed state (as 713) in which a pattern of protrusions 705 on one leaf 703 pass through the cloth and through corresponding apertures 704 in the opposite leaf 702, where they lock in place owing to the provision of somewhat dilated ends. These clips have been modified with a central cutout slot 714 in which we place an insert 706 of aluminium or copper. The insert can be crimped over the edge wire (as shown in the crimped state 711 and the uncrimped state 710), and in use it engages with the plastic of the folded-over hail clip to transfer tension to the cloth. The slot running along the length of the insert neatly fits the wire and may have a granular gripping material applied to its inside such as a sand/paint mixture to aid in gripping. Our preferred insert has dilated ends 707 and section 708 to maximise contact with the hail clip, and a constricted middle 709 for crimping purposes. The insert can be made in bulk from sheet material by a sequence of a folding and a pressure deforming action.

FIG. 8 shows one improved form of mounting for the barrier, which provides it with means to discard loads which may build up on the upper surface of a horizontally orientated barrier—as during hail or snow. The left diagram shows a deployed barrier 806 in its normal protective position, in front of a support pole (shown as discontinuous lines 800. The deflected barrier 801 is in the act of shedding a load to each side of the line of crops. Details of the central hinge which is one means to provide a resilient connection between the split spreader are shown in the other two diagrams. In these mounts, the horizontal spreader 804 is split at its centre and a resilient section is included. This is preferably a coiled wire spring 807, 810. When deployed, each half of the spreader is separately held against spring pressure in a substantially horizontal position by a tie 805 of light rope to a lower support cable 811 (411 in FIG. 4). The ties may be of any durable or easily tied material preferably having a safe load above about 100 lb force.

As alternatives for the resilient section, one might use a single strip of fibreglass, optionally with an arcuate shape used with the concave side facing upwards as a replacement for both spreaders and the central spring, or use a leaf-spring arrangement between pipe spreaders. A preferred length for the fibreglass arc is 5 meters.

If sufficient snow or hail accumulates, the weight will cause the spring to give way and the barrier will slope downwards as shown at 801, thereby dropping the material to the ground but out to either side of the crop or tree under protection, and then spring back to its protecting substantially horizontal orientation 806.

Note that two separate strips of cloth, one on each side of the central support cable are used in this example; one strip is labelled 803.

The spring 807, 810 is preferably ⅜" spring steel formed into a 1' circle with one turn or a 6" circle with 2 turns. The ends are preferably coupled to the plastic pipe 808 used as spreaders by bending them to fit inside a preferred 1.25" bore waste pipe of PVC. A reinforcing collar 809 is placed over the outside of the pipe, over the spring ends. Note that we prefer to provide the spring 807 with obliquely bent ends so that when the barrier is contracted (and here the preferred direction of movement for contraction is clockwise) the spreaders lie parallel to and beside the central support cable 810 (like 409 in FIG. 4) and the wide aperture inside the spring allows it freedom to twist about the central cable. A one or two-turn spring is easy to thread over the cable at any point without having to pass it over the cable from one free end.

For hail protection the barrier may be in its contracted state until an imminent hailstorm or the like requires its expansion to cover the trees, as indicated in FIG. 1 and elsewhere. The actuator causing expansion is means to apply extra tension to one of the elongated support cables in relation to the other. This may preferably be a winch or pulley driven by an electric motor and a typical transition time from a contracted to an expanded state may be of the order of 30 seconds. A series of electric motors driven in parallel from a common supply line may be controlled remotely, for example in response to a weather radar report of hail forming in the vicinity, or by local observation, or on a more local scale by a device including a microphone sensitive to the noise made by hailstones hitting a sounding board such as a metal sheet.

If bird or wind protection is the primary purpose of the barrier, it may be left in its extended state throughout much of the growing season.

Example 2. Sun shade.

The invention in this application is intended to provide a readily deployable shade over plants or animals yet be easily reduced to a minimum size if the ambient light falls. It may be stored in a closed or contracted form lying above and along the length of an elongated area to be protected, which may be a row of trees or other crop, or may be along water troughs in a feedlot for cattle, or may optionally be placed along a fenceline along which animals like to congregate. The sun shade may be expanded to its full size simply by pulling on one or both edge-supporting cables. Intermediate settings will provide a "dappled" shade with strips or patches of light passing between partially contracted strips of shade fabric.

Figure 9:
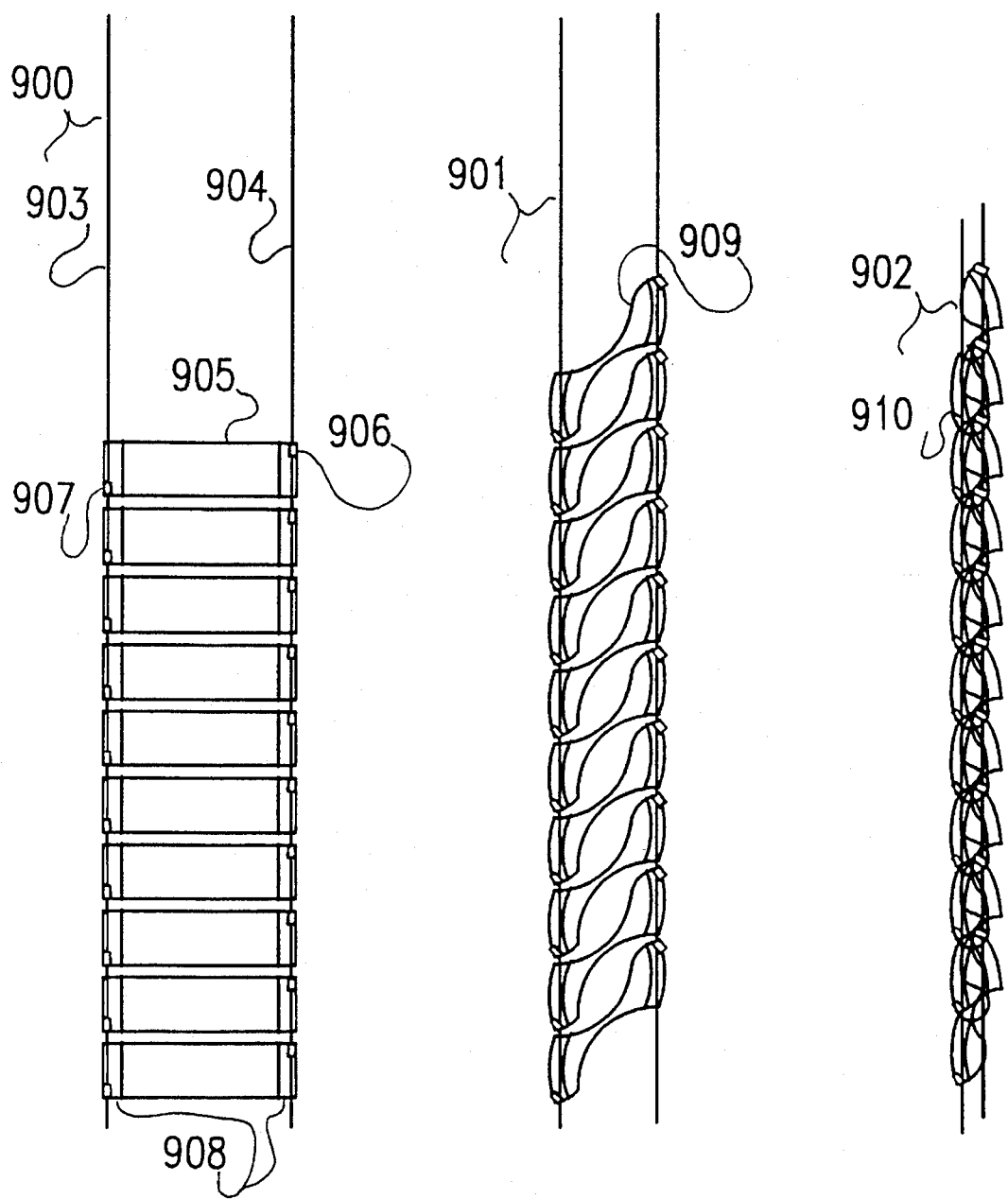
FIG. 9: illustrates a preferred sun shade type of barrier including a linear array of flexible strips.

FIG. 9 illustrates one preferred embodiment of a sun shade. A fabric which blocks substantially all of the direct light incident on it is preferred although some light may pass through without detracting from the effectiveness of the installation. The shade is shown in its expanded configuration at 900, a partially contracted configuration at 901, and a contracted configuration at 902. The preferred shade comprises a series of 300 mm wide strips 905 of preferably a woven fabric capable of resisting environmental degradation, such as one of the horticultural plastics, black-dyed polyethylene or polypropylene. Each strip 905 is preferably sewn with a hem to include a rather wide, floppy loop at each end like 908 and is clipped or attached at diagonally opposite corners (906, 907) to a supporting cable (903 and 904). Means to allow replacement strips to be installed easily include providing crimpable collectors similar to that of FIG. 7 (but preferably narrower), and the use of a similar press-through fastener, or a rapidly setting glue, or simply sewing a hem on-site to form the loop (908) at each end of the strip. The wide hem allows the strip to pivot about its attachment point without distortion and excessive forces as the shade approaches its contracted state.

As the shade contracts (as shown in 901 and 902) there is some distortion of the strips as this fabric is less easily twisted into a parallelogram shape than the hail barrier fabric of Example 1.

Advantages of the strip approach, apart from the easy deployment which is as described for example 1, include that it may be easily repaired by on-site replacement of a damaged strip; the rest of the structure need not be brought down for repair.

Optionally a perimeter windbreak may be installed and may be attached to the structure. This can also serve to keep birds, bats, and large insects out of the enclosed space.

Finally, it will be appreciated that various alterations and modifications may be made to the foregoing without departing from the scope of this invention as set out in the following claims.

I claim:

1. A retractable barrier to at least partially shield an area, said barrier comprising a deformable panel supported along its length by a pair of elongate elements wherein each elongate element is attached to one or more supports at a required distance above the ground so that the barrier can be positioned in a plane above the ground in a shielding configuration with the panel assuming a first extended substantially parallelogram shape, and actuator means for applying a force or forces to opposite corners of the panel to distort the panel from the shielding configuration to a much narrower substantially parallelogram configuration, said panel remaining substantially in said plane during said distortion.

2. A barrier as claimed in claim 1, wherein the panel is made up of a plurality of separate strips of flexible material.

3. A barrier as claimed in claim 1, wherein the panel includes at least one deformable net.

4. A barrier as claimed in claim 3, wherein the deformable net is a woven fabric net having warp threads extending substantially parallel to the length of the woven fabric net and weft threads at substantially right angles thereto in the shielding configuration, the woven fabric net having a loose weave between the warp and weft threads so that in use the net can be deformed into parallelograms of various configurations.

5. A barrier as claimed in claim 4, wherein the woven fabric net has a leno weave.

6. A barrier as claimed in claim 5, wherein the panel is substantially rectangular in its shielding configuration having a pair of longer sides and a pair of short sides, said longer sides being supported by said elongate elements, and each short side being supported by a substantially rigid strut.

7. A barrier as claimed in claim 6, wherein the panel is attached to said elongate elements, along its longer sides by a plurality of clips wherein each clip is crimped to one of said elongate elements.

8. A barrier as claimed in claim 7, wherein a plurality of panels are aligned side by side so that the panels provide a substantially continuous barrier when each panel is in its extended shape.

9. A barrier as claimed in claim 8, wherein each panel when extended assumes a curved or angled configuration to provided a tent like structure over an area of ground.

10. A barrier as claimed in claim 9, wherein each panel has a downwardly extending supplementary portion which can in use function as protection against obliquely oriented damaging materials.

11. A barrier as claimed in claim 1, wherein the actuator means includes means for applying substantially parallel opposed forces to diagonally opposite corners of the panel to cause said distortion.

\* \* \* \* \*